United States Patent
Gilbert et al.

(12) 
(10) Patent No.: US 6,394,219 B1
(45) Date of Patent: May 28, 2002

(54) HYDRAULIC POWER STEERING SYSTEM WITH A PRESSURE RELIEF VALVE

(75) Inventors: Wendell L. Gilbert, Pleasant Shade; David E. Panter, Jr., Lebanon, both of TN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/595,836

(22) Filed: Jun. 16, 2000

(51) Int. Cl.[7] .............................................. B62D 5/087
(52) U.S. Cl. .................. 180/441; 137/516.25; 137/513; 137/512.5
(58) Field of Search ........................ 137/513.5, 516.27, 137/516.25, 563, 513, 512.5; 180/417, 429, 441, 442

(56) References Cited

U.S. PATENT DOCUMENTS

| | | | |
|---|---|---|---|
| 2,688,978 A | * | 9/1954 | Von Wangenheim |
| 2,769,457 A | * | 11/1956 | Wittenberg |
| 3,892,254 A | * | 7/1975 | Hilgert ..................... 137/116.3 |
| 4,394,945 A | * | 7/1983 | Taylor, Jr. ................... 222/571 |
| 4,542,768 A | * | 9/1985 | Harris ......................... 137/856 |
| 4,609,330 A | * | 9/1986 | Fahey et al. ................ 417/288 |
| 4,633,853 A | * | 1/1987 | Prill et al. ................... 126/362 |
| 4,715,464 A | * | 12/1987 | Nakamura et al. ........... 180/142 |
| 4,773,303 A | * | 9/1988 | Stroud ....................... 91/375 A |
| 5,183,075 A | * | 2/1993 | Stein ......................... 137/493.6 |
| 5,553,683 A | * | 9/1996 | Wenzel et al. ............... 180/417 |
| 5,584,314 A | * | 12/1996 | Bron ........................... 137/239 |
| 6,123,101 A | * | 9/2000 | Velie et al. .................. 137/517 |
| 6,148,853 A | * | 11/2000 | Wang ....................... 137/493.6 |

* cited by examiner

*Primary Examiner*—Brian L. Johnson
*Assistant Examiner*—Avraham H. Lerner
(74) *Attorney, Agent, or Firm*—Tarolli, Sundheim, Covell, Tummino & Szabo L.L.P.

(57) ABSTRACT

A hydraulic power steering system (10) for turning steerable wheels of a vehicle. The system (10) comprises a steering gear (12) including a hydraulic motor and a steering valve. The steering gear is susceptible to pressure fluctuations that cause noise during steering. The system (10) further comprises a pressure relief valve (14) having an unactuated condition and actuated conditions. The pressure relief valve (14), in the unactuated condition, restricts fluid flow through the pressure relief valve (14). In an actuated condition, the pressure relief valve (14) permits fluid flow through the pressure relief valve (14). The pressure relief valve (14) progressively is operable from the unactuated condition to an actuated condition as a pressure differential between the inlet (38) and the outlet (40) of the steering gear (12) increases.

9 Claims, 3 Drawing Sheets

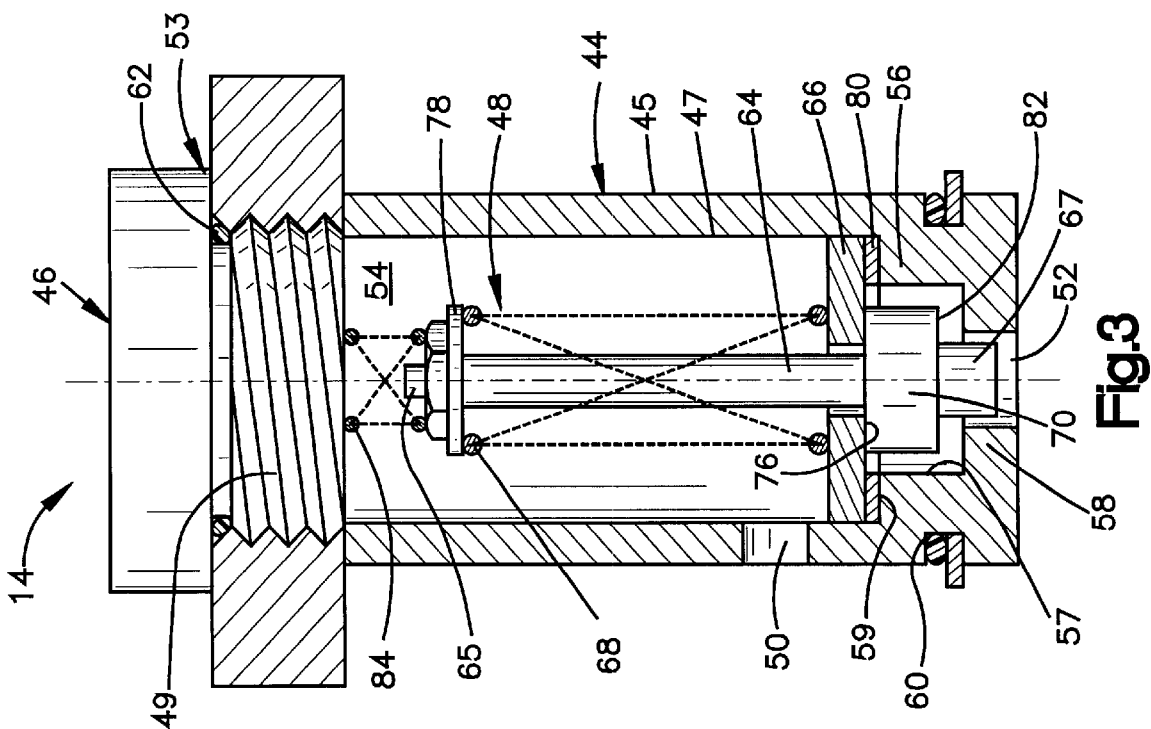
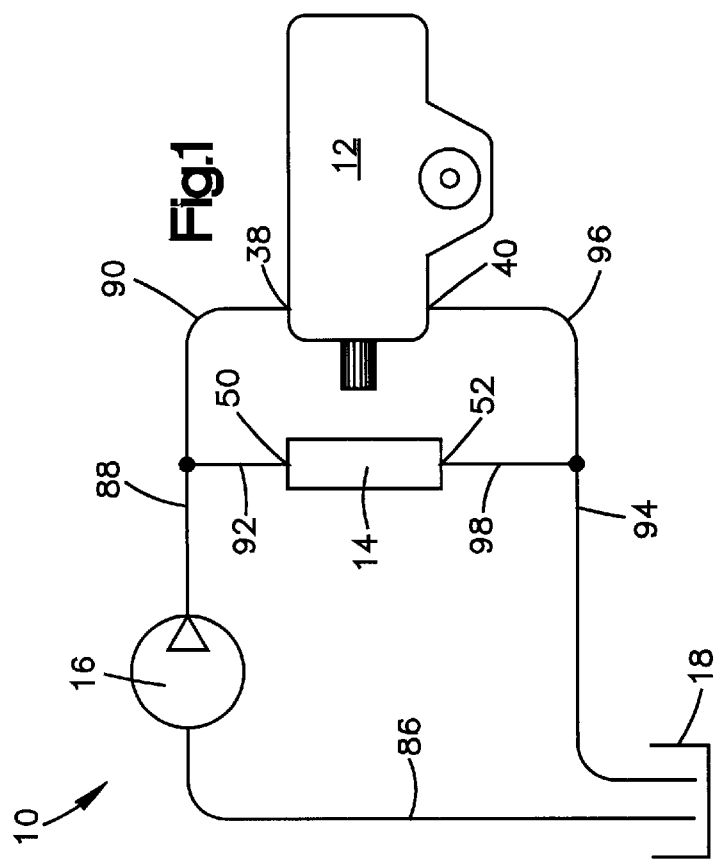

HYDRAULIC POWER STEERING SYSTEM WITH A PRESSURE RELIEF VALVE

TECHNICAL FIELD

The present invention relates to a hydraulic power steering system for turning steerable wheels of a vehicle.

DESCRIPTION OF THE PRIOR ART

A known power steering gear for turning steerable wheels of a vehicle is hydraulically operated. The power steering gear is associated with a pump that may be powered by the vehicle engine. The power steering gear, to aid the vehicle driver in turning the steerable wheels of the vehicle, utilizes pressurized hydraulic fluid from the pump.

The power steering gear includes a hydraulic motor and a steering valve for controlling fluid flow to the hydraulic motor. The hydraulic motor includes two chamber portions that are separated by an axially movable piston. A fluid pressure difference in the respective chamber portions causes the piston to move axially resulting in movement of the steerable wheels of the vehicle. Resistance to movement of the steerable wheels results in an increased pressure in the inlet of the steering gear. This increased pressure may result in some instability in the vehicle steering and some audible noise.

SUMMARY OF THE INVENTION

The present invention is a hydraulic power steering system for turning steerable wheels of a vehicle. The system comprises a steering gear that includes a hydraulic motor and a steering valve for controlling actuation of the hydraulic motor by controlling fluid flow to the hydraulic motor. The hydraulic motor when actuated turns steerable vehicle wheels. The steering gear has an inlet, in communication with a fluid source, and an outlet for directing the fluid from the steering gear to a reservoir. The steering gear is susceptible to pressure fluctuations that may cause noise during steering.

The system further comprises a pressure relief valve having an unactuated condition and actuated conditions. The pressure relief valve, in the unactuated condition, restricts fluid flow through the pressure relief valve. In an actuated condition, the pressure relief valve permits fluid flow through the pressure relief valve. The pressure relief valve progressively moves from the unactuated condition to an actuated condition as a pressure differential between the inlet and the outlet of the steering gear increases. The pressure relief valve, when in an actuated condition, provides fluid communication between the inlet and the outlet of the steering gear to minimize pressure fluctuations in the steering gear.

BRIEF DESCRIPTION OF THE DRAWINGS

The foregoing and other features of the present invention will become apparent to those skilled in the art to which the present invention relates upon reading the following description of the present invention with reference to the accompanying drawings, in which:

FIG. 1 is a schematic illustration of a vehicle steering system embodying the present invention;

FIG. 3 is an illustration of an embodiment of the pressure relief valve of the system of the present invention;

DESCRIPTION OF PREFERRED EMBODIMENT

Figure 2:
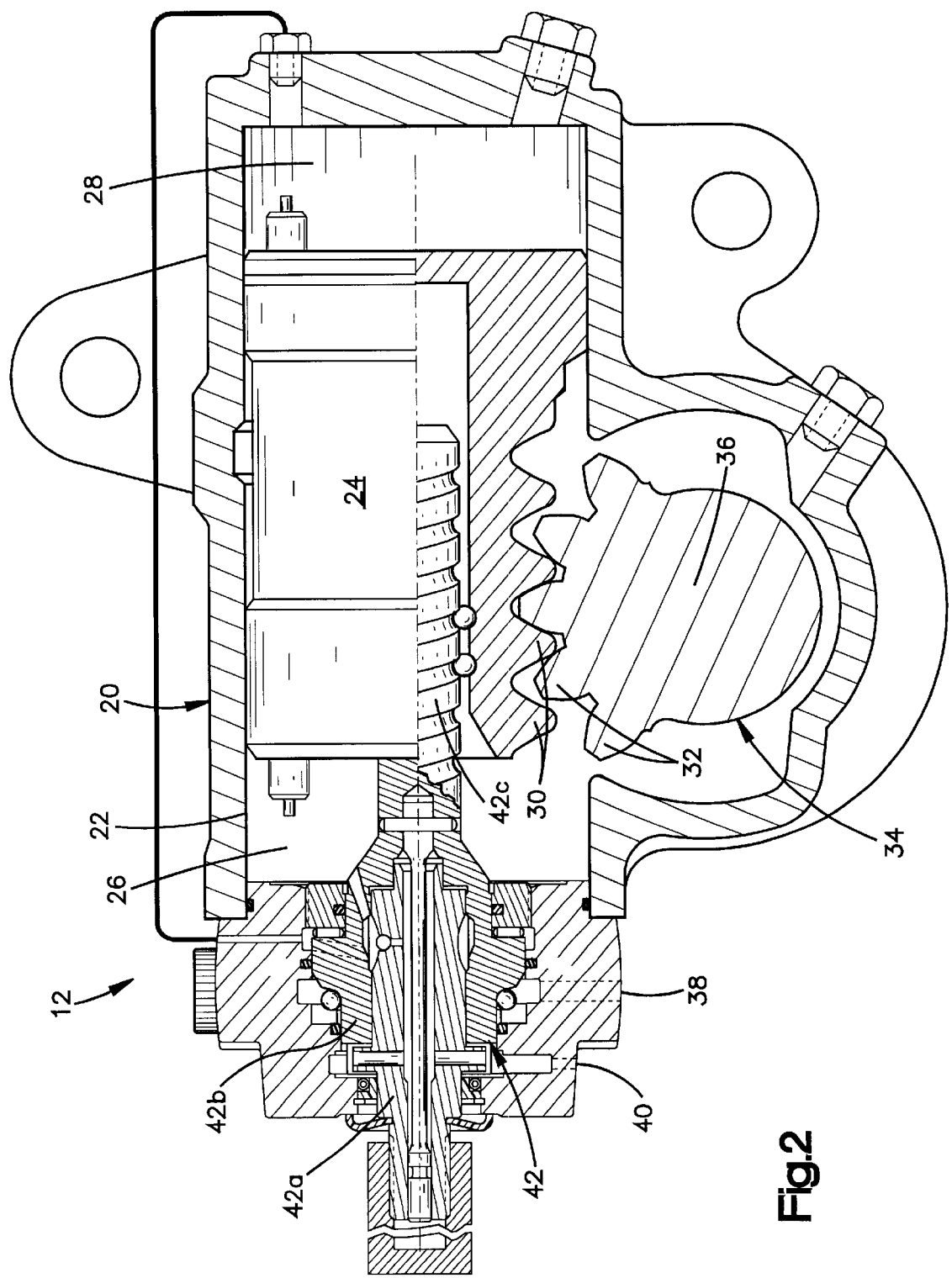
FIG. 2 is an illustration of a steering gear used in the system of the present invention.

FIG. 1 is a schematic illustration of a hydraulic power steering system 10 embodying the present invention. The system 10 includes a hydraulic steering gear 12 and a pressure relief valve 14. The steering gear 12 and the pressure relief valve 14 are in parallel connection to one another in the system 10. Both the steering gear 12 and the pressure relief valve 14 receive fluid from a pump 16 that is connected to a fluid reservoir 18.

A feed line 86 extends from the reservoir 18 to the inlet of the pump 16. The outlet of the pump 16 is in fluid communication with a conduit 88. Conduit 88 communicates with conduits 90 and 92 for directing fluid to the steering gear 12 and the pressure relief valve 14, respectively. The conduit 90 communicates with an inlet 38 of the steering gear 12, and conduit 92 communicates with an inlet 50 of the pressure relief valve 14.

Conduit 94 is in fluid communication with outlets 40 and 52 of the steering gear 12 and the pressure relief valve 14, respectively. A first conduit 96 and a second conduit 98 extend from the outlets 40 and 52 of the steering gear 12 and the pressure relief valve 14, respectively, and communicate with the conduit 94. Conduit 94 communicates with the reservoir 18.

FIG. 2 illustrates the steering gear 12 of the system 10. As those skilled in the art will recognize, the steering gear 12 of FIG. 2 is for illustrative purposes only. The system 10 of the present invention may incorporate any suitable hydraulic steering gear.

The steering gear 12 has a housing 20 with an inner cylindrical surface 22 defining a chamber. A piston 24 is located within the chamber and divides the chamber into opposite chamber portions 26 and 28. One chamber portion 26 or 28 is located on each end of the piston 24. The piston 24 creates a seal between the respective chamber portions 26 and 28 and is capable of axial motion within the chamber. This axial motion of the piston 24 is caused by a pressure differential across the piston (between chamber portions 26 and 28). As the piston 24 moves axially an increase in volume of one portion of the chamber 26 or 28 and a corresponding decrease in the volume of the other portion of the chamber 26 or 28 occurs.

A series of rack teeth 30 is formed on the periphery of the piston 24. The rack teeth 30 mesh with the teeth 32 formed on a sector gear 34. The sector gear 34 is fixed on an output shaft 36 that extends outwardly through an opening (not shown) in the housing 20. The output shaft 36 is typically connected to a pitman arm (not shown) that is connected to the steering linkage (not shown) of the vehicle. Thus, as the sector gear 34 rotates, the output shaft 36 is rotated to operate the steering linkage. As a result, the steerable wheels are turned.

The housing 20 of the steering gear 12 includes the inlet 38 and the outlet 40. The inlet 38 is in fluid communication with the pump 16 and is in fluid communication with a directional control valve 42 of the steering gear 12.

The directional control valve 42 is also known as a steering valve. The directional control valve 42 includes relatively rotatable valve members 42a, 42b. Valve member 42a rotates in response to rotation of the steering wheel of the vehicle. Valve member 42b rotates in a follow-up manner as is known. The valve members 42a, 42b direct the flow of hydraulic fluid to one of the chamber portions 26 or 28.

The flow of hydraulic fluid to one of the chamber portions 26 or 28 increases the pressure within that chamber portion 26 or 28 and causes the piston 24 to move axially. The piston 24 moves axially until the pressure within the chamber portions 26 and 28 equalizes or until the piston moves to a limit. The valve member 42b rotates due to axial movement of the piston 24 that causes rotation of screw 42c, which is connected to and rotates valve member 42b. As the volume of one chamber portion 26 or 28 increases to accommodate the increased fluid, the volume of the other chamber portion 26 or 28 decreases. Hydraulic fluid flows from the chamber portion that is decreasing in volume to the directional control valve 42. This fluid exits from the directional control valve 42 and the housing 20 of the steering gear 12 through the outlet 40.

FIG. 3 illustrates an embodiment of the pressure relief valve 14 of the system 10. Those skilled in the art will recognize that the system 10 may incorporate a pressure relief valve of a different construction.

The pressure relief valve 14 includes a valve body 44, a valve plug 46, and a valve stem assembly 48. The valve body 44 is a hollow, cylindrical body formed of an outer cylindrical surface 45 and an inner cylindrical surface 47. A cylindrical valve chamber 54 is defined by the inner cylindrical surface 47.

The valve body 44 includes three openings. A first opening is threaded to receive the valve plug 46. The first opening is located on a first end 53 of the cylindrical valve body 44 and is defined by the inner cylindrical surface 47 of the valve body 44. The second and third openings form the valve inlet 50 and the valve outlet 52, respectively. The valve inlet 50 is an opening that extends through the cylindrical surfaces 45 and 47 of the valve body 44 and allows fluid flow into a cylindrical valve chamber 54. The valve outlet 52 is located on a second end 58 of the valve body 44 and allows fluid flow out of the chamber 54.

A ledge 56 extends radially inwardly from the inner cylindrical surface 47 into the cylindrical valve chamber 54 at the second end 58 of the valve body 44 near the valve outlet 52. The ledge 56 extends axially approximately 20% of the length of the chamber 54. The ledge 56 has an axially extending, cylindrical ledge surface 57 and a radially extending, annular ledge surface 59. The diameter of the chamber 54 is reduced in the area containing the ledge 56 by 25% to 40%. The diameter of the valve outlet 52 is approximately 50% of the diameter of the chamber 54 in the area of the ledge 56.

A groove 60 is located on the outer cylindrical surface 45 of the valve body 44 between the valve inlet 50 and the valve outlet 52. Preferably, the groove 60 is located in the area of the valve body 44 near the ledge 56. The groove 60 contains a seal for sealing between the valve body 44 and the conduit 98 that may be attached to the pressure relief valve 14.

The valve plug 46 has a threaded portion 49 for connecting with the first opening of the valve body 44. A seal 62 is placed between the valve body 44 and the valve plug 46 to seal the threaded connection.

The valve stem assembly 48 includes a valve stem 64, a flow disk 66, and a primary spring 68. The valve stem 64 is a long, cylindrical rod having a first end 65 that is threaded and a second end 67 with a sealing cylinder 70. The sealing cylinder 70 is a cylindrical portion of the valve stem 64 that extends radially outwardly from the cylindrical rod and has a diameter greater than the diameter of the valve outlet 52.

Figure 4:
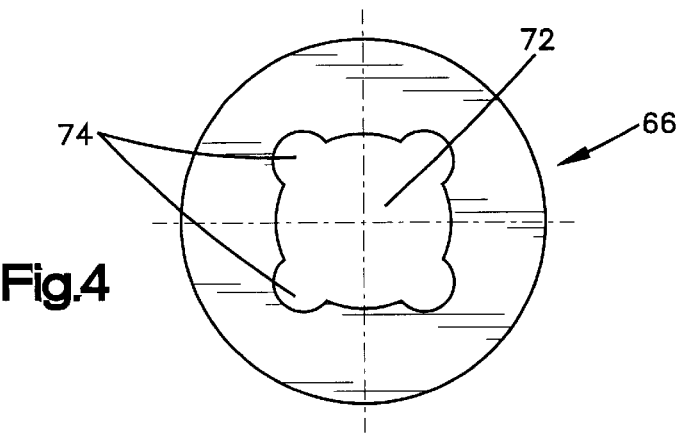
FIG. 4 is an illustration of a part of the pressure relief valve of the system of the present invention.

As shown in FIG. 4, the flow disk 66 has a central, circular opening 72 and a plurality of flow vanes 74. The flow vanes are four semi-circular openings that are equally spaced apart around the opening 72 and extend radially outwardly from the opening 72 and are in fluid communication with opening 72. The flow vanes are optional. The opening 72 of the flow disk 66 is sized to receive the cylindrical rod of the valve stem 64 but is small enough to be sealed by the sealing cylinder 70 when the sealing cylinder 70 engages the lower side of the flow disk 66, as viewed in FIG. 3. If flow vanes 74 are provided, the flow vanes 74 are not sealed by the engagement of the sealing cylinder 70 with the lower side of the flow disk 66, as viewed in FIG. 3.

The flow disk 66 has an outer diameter that is larger than the diameter of the valve body 44 measured at the ledge 56 but is smaller than the diameter of the valve body 44 measured away from the ledge 56.

The primary spring 68 is a helically wound compression spring. The diameter of the helix of the primary spring 68 is large enough to receive the cylindrical rod of the valve stem 64 but is small enough to fit within the chamber 54 of the valve body 44.

When the valve stem assembly 48 is assembled, the valve stem 64 is inserted into the opening 72 of the flow disk 66 so that the flow disk 66 rests on a first surface 76 of the sealing cylinder 70. The valve stem 64 is then inserted through the center of the helix of the primary spring 68 until an end of the primary spring 68 rests on the flow disk 66. A retaining nut 78 is threaded onto the first end 65 of the valve stem 64. The retaining nut 78 contacts the other end of the primary spring 68 and compresses the primary spring 68 between the retaining nut 78 and the flow disk 66. The retaining nut 78 can be tightened or loosened on the first end 65 of the valve stem 64 to adjust the level of compression of the primary spring 68. The compressed primary spring 68 forces the flow disk 66 against a first sealing face 76 of the sealing cylinder 70.

When the pressure relief valve 14 is assembled, a cylindrical, adjustable shim 80 is placed on the radially extending surface 59 of the ledge 56 of the valve body 44. The valve stem assembly 48 is then inserted into the chamber 54 so that the flow disk 66 is pressed against the adjustable shim 80. A secondary spring 84 is placed on the first end 65 of the valve stem 64 above the retaining nut 78 and is attached to the valve plug 46. The secondary spring 84 is a helical compression spring. When the valve plug 46 is threaded onto the valve body 44, the secondary spring forces the valve stem 64 away from the valve plug 46 and toward the valve outlet 52 such that the flow disk 66 seals against the adjustable shim 80.

During operation of the power steering system 10 of the vehicle, the pump 16 draws hydraulic fluid from the reservoir 18 and pumps it into the conduit 88 and conduits 90 and 92. The fluid pressurizes the inlets 38 and 50 of the steering gear 12 and the pressure relief valve 14, respectively. The hydraulic fluid flows through the steering gear 12 and exits the steering gear through outlet 40 into the conduit 96. If the pressure relief valve 14 has flow vanes 74 in the flow disk 66 or the pressure relief valve 14 is in an actuated condition, fluid exits the pressure relief valve through conduit 98. The hydraulic fluid enters conduit 94 and is returned to the reservoir 18.

When a pressure rise occurs in the steering gear 12 due to resistance to turning of the steerable wheels of the vehicle, the pressure increases in the conduits 88, 90, 92 and the pressure increases in the steering gear inlet 38 and the pressure relief valve inlet 50. The increase in pressure at the inlet 50 of the pressure relief valve 14 increases the pressure in the chamber 54 of the pressure relief valve 14. When a predetermined pressure differential is reached across the pressure relief valve 14 (between the inlet 50 and the outlet 52), the pressure relief valve 14 actuates. The predetermined pressure differential at which the pressure relief valve actuates is also the pressure differential across the steering gear 12 because the pressure at the inlet 50 of the pressure relief valve 14 corresponds to the pressure at the inlet 38 of the steering gear and the pressure at the outlet 52 of the pressure relief valve corresponds with the pressure at the outlet 40 of the steering gear. Thus, the pressure relief valve 14 actuates when there is a predetermined pressure differential across the steering gear 12.

Operation of the pressure relief valve 14 is described with reference to FIGS. 3–5. In an unactuated condition, the first sealing face 76 of the sealing cylinder 70 is pressed against the flow disk 66 such that the first sealing face 76 completely blocks the opening 72 in the flow disk 66. If the flow disk 66 has flow vanes 74, there is restricted fluid flow through the pressure relief valve 14 when the pressure relief valve 14 is in an unactuated condition since fluid flows through the flow vanes 74 of the flow disk 66. If the flow disk 66 does not have flow vanes 74, all fluid flow through the pressure relief valve 14 is blocked when the pressure relief valve 14 is in an unactuated condition.

When the predetermined pressure differential between the valve inlet 50 and the valve outlet 52 is reached, the valve stem 64, including the sealing cylinder 70, moves downward and away from the flow disk 66. The downward movement removes the sealing cylinder 70 from contact with the flow disk 66 allowing hydraulic fluid to flow through the opening 72 to the valve outlet 52. This flow of hydraulic fluid decreases the pressure differential between the inlets 38 and 50 and outlets 40 and 52 of the steering gear 12 and the pressure relief valve 14. The spring constant of the primary spring 68, the tension applied onto the primary spring 68 by the retaining nut 78, and the surface area of the sealing cylinder 70 subject to the pressure of the hydraulic fluid determine the predetermined pressure differential at which the valve stem 64 moves downward.

The pressure relief valve 14 has a plurality of actuated positions. The pressure relief valve 14 is actuated when the valve stem 64 moves away from the flow disk 66. As the pressure differential across the pressure relief valve 14 increases, the valve stem 64 moves progressively away from the flow disk 66 and toward the second end 58 of the valve body 44.

When in an actuated condition, the amount of flow through the pressure relief valve 14 is limited by the smaller of two gaps. The first gap is formed between the first sealing face 76 of the sealing cylinder 70 and the flow disk 66. The second gap is formed between a second sealing face 82 of the sealing cylinder 70 and the second end 58 of the valve body 44.

Figure 5:
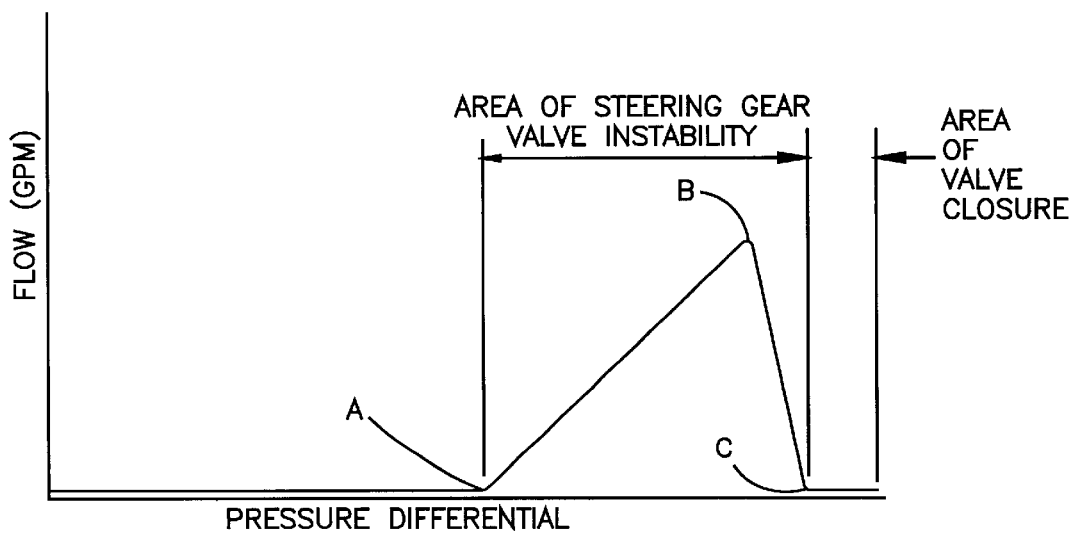
FIG. 5 is a graph depicting the flow of hydraulic fluid through the pressure relief valve of the system of the present invention.

As shown in FIG. 5, when the pressure differential across the pressure relief valve 14 reaches the predetermined level (shown by A), the pressure relief valve 14 is actuated and fluid begins to flow through the pressure relief valve 14. The fluid flow through the pressure relief valve 14 increases as the pressure differential increases until a second predetermined pressure differential (shown by B) is reached. The second predetermined pressure differential occurs when there is an equal amount of fluid flow through both the first gap and the second gap. After the second predetermined pressure differential is reached, a further increase in the pressure differential causes the sealing cylinder 70 to move progressively closer to the second end 58 of the valve body 44 and to begin to restrict the fluid flow through the pressure relief valve 14. When the pressure relief valve 14 is actuated such that the second sealing face 82 seals against the second end 58 of the valve body 44 (shown by C), fluid flow through the pressure relief valve 14 is completely blocked.

As the vehicle driver turns the steering wheel, there is relative rotary displacement of the valve members 42a, 42b. Valve gain is the pressure rise in chamber portion 26 or 28 for a given rotary displacement of the valve members 42a, 42b. Minor fluctuations in rotary displacement of the valve members 42a and 42b can result in large fluctuations in pressure in the chamber portions 26 or 28, particularly at high pressures. These pressure fluctuations can cause noise and some vehicle instability. The pressure relief valve 14 reduces the pressure fluctuations at high pressure by providing some fluid communication between the steering gear inlet 38 and steering gear outlet 40.

The pressure fluctuations that are to be reduced may occur at different pressures in different vehicles. The adjustment of the primary spring 68 in the pressure relief valve 14 will change the pressure at which the pressure relief valve 14 actuates. Thus, the pressure relief valve 14 may be used in different vehicles and adjusted for the particular vehicle in which it is used.

From the above description of the invention, those skilled in the art will perceive improvements, changes and modifications. Such improvements, changes and modifications within the skill of the art are intended to be covered by the appended claims.

What is claimed is:

1. A hydraulic power steering system for turning steerable wheels of a vehicle, the system comprising:

a steering gear including a hydraulic motor actuatable to turn the steerable vehicle wheels and a steering valve for controlling actuation of the hydraulic motor by controlling fluid flow to the hydraulic motor, the steering gear having an inlet in communication with a fluid source and an outlet for directing fluid from the steering gear back to the fluid source, the steering gear being susceptible to pressure fluctuations that cause noise during steering; and a pressure relief valve having an unactuated condition and a plurality of actuated conditions, the pressure relief valve in the unactuated condition restricting fluid flow through the pressure relief valve, the pressure relief valve progressively being operable from the unactuated condition to a first actuated condition as a pressure differential between the inlet and the outlet of the steering gear increases, the pressure relief valve increasing fluid flow through the pressure relief valve as the pressure relief valve is progressively operated from the unactuated condition to the first actuated condition, the pressure relief valve when in the first actuated condition providing fluid communication between the inlet and the outlet of the steering gear and causing fluid flow to circumvent the steering gear to minimize the pressure fluctuations in the steering gear;

the pressure relief valve being operable from the first actuated condition to a second actuated condition, the pressure relief valve blocking fluid flow through the pressure relief valve when in the second actuated condition.

2. The hydraulic power steering system in claim 1, further being defined by:
the pressure relief valve including a valve stem movable to control the fluid flow through the pressure relief valve.

3. The hydraulic power steering system in claim 2, further being defined by:
a spring being responsive to the pressure differential and controlling the movement of the valve stem.

4. The hydraulic power steering system in claim 3, further being defined by:
the pressure differential at which the valve stem moves being adjustable.

5. The hydraulic power steering system in claim 1, further being defined by:
the pressure relief valve when in the unactuated condition blocking fluid flow through the pressure relief valve.

6. The hydraulic power steering system in claim 1, further being defined by:
the pressure relief valve having a valve body and a valve stem, the valve body defining a chamber and having an end with a valve outlet, the valve stem being located within the chamber of the valve body and including a sealing member, in the second actuated condition the sealing member of the valve sterm seating against the end of the valve body to block fluid flow through the valve outlet.

7. A hydraulic power steering system for turning steerable wheels of a vehicle, the system comprising:
a steering gear including a hydraulic motor actuatable to turn the steerable vehicle wheels and a steering valve for controlling actuation of the hydraulic motor by controlling fluid flow to the hydraulic motor, the steering gear having an inlet in communication with a fluid source and an outlet for directing fluid from the steering gear back to the fluid source, the steering gear being susceptible to pressure fluctuations that cause noise during steering; and
a pressure relief valve having an unactuated condition and actuated conditions, the pressure relief valve when in the unactuated condition permitting restricted fluid flow through the pressure relief valve and in at least one of the actuated conditions permitting increased fluid flow through the pressure relief valve, the pressure relief valve progressively being operable from the unactuated condition to the actuated conditions as a pressure differential between the inlet and the outlet of the steering gear increases, the pressure relief valve providing fluid communication between the inlet and the outlet of the steering gear and causing fluid flow to circumvent the steering gear to minimize the pressure fluctuations in the steering gear;
the pressure relief valve having a valve stem and a flow disk, a plurality of flow vanes extending through the flow disk, in the unactuated condition a sealing member of the valve stem seating against the flow disk and allowing restricted fluid flow through the pressure relief valve.

8. A hydraulic power steering system for turning steerable wheels of a vehicle, the system comprising:
a steering gear including a hydraulic motor actuatable to turn the steerable vehicle wheels and a steering valve for controlling actuation of the hydraulic motor by controlling fluid flow to the hydraulic motor, the steering gear having an inlet in communication with a fluid source and an outlet for directing fluid from the steering gear back to the fluid source, the steering gear being susceptible to pressure fluctuations that cause noise during steering; and
a pressure relief valve having an unactuated condition and a plurality of actuated conditions, the pressure relief valve progressively being operable from the unactuated condition to a first actuated condition as a pressure differential between the inlet and the outlet of the steering gear increases, the pressure relief valve increasing fluid flow through the pressure relief valve as the pressure relief valve is progressively operated from the unactuated condition to the first actuated condition, the pressure relief valve when in the first actuated condition providing fluid communication between the inlet and the outlet of the steering gear and causing fluid flow to circumvent the steering gear to minimize the pressure fluctuations in the steering gear;
the pressure relief valve being operable from the first actuated condition to a second actuated condition, the pressure relief valve progressively decreasing fluid flow through the pressure relief valve as the pressure relief valve is operated from the first actuated condition to the second actuated condition, the second actuated condition not being encountered as the pressure relief valve is operated from the actuated condition to the first actuated condition.

9. A hydraulic power steering system for turning steerable wheels of a vehicle, the system comprising:
a steering gear including a hydraulic motor actuatable to turn the steerable vehicle wheels and a steering valve for controlling actuation of the hydraulic motor by controlling fluid flow to the hydraulic motor, the steering gear having an inlet in communication with a fluid source and an outlet for directing fluid from the steering gear back to the fluid source, the steering gear being susceptible to pressure fluctuations that cause noise during steering; and
a pressure relief valve having an unactuated condition and a plurality of actuated conditions, the pressure relief valve being operable from the unactuated condition to a first actuated condition as a pressure differential between the inlet and the outlet of the steering gear increases to a first predetermined level, the pressure relief valve when in the first actuated condition providing a maximum fluid flow through the pressure relief valve and between the inlet and the outlet of the steering gear, the fluid flow through the pressure relief valve circumventing the steering gear to minimize the pressure fluctuations in the steering gear;
the pressure relief valve further being operable from the first actuated condition to a second actuated condition as the pressure differential between the inlet and the outlet of the steering gear increases from the first predetermined level to a second predetermined level, the pressure relief valve decreasing fluid flow through the pressure relief valve as the pressure relief valve is operated from the first actuated condition to the second actuated condition.

* * * * *